United States Patent [19]
Hastings

[11] Patent Number: 5,794,271
[45] Date of Patent: Aug. 18, 1998

[54] HELMET SHELL STRUCTURE

[76] Inventor: Dale Hastings, 4520 Auburn Blvd., Sacramento, Calif. 95841

[21] Appl. No.: 732,941

[22] Filed: Oct. 17, 1996

[51] Int. Cl.$^6$ ............................................. A42B 3/00
[52] U.S. Cl. ............................................................ 2/412
[58] Field of Search .......................... 2/2.5, 410, 411, 2/412, 414

[56] References Cited

U.S. PATENT DOCUMENTS

| | | | |
|---|---|---|---|
| 2,312,227 | 2/1943 | Yant | 2/412 |
| 3,573,150 | 3/1971 | Broutman et al. | 2/2.5 |
| 3,885,246 | 5/1975 | Tung | 2/412 |
| 4,209,858 | 7/1980 | Coenen | 2/412 |
| 4,300,242 | 11/1981 | Nava et al. | 2/412 |
| 4,732,803 | 3/1988 | Smith, Jr. | 2/412 |
| 4,879,165 | 11/1989 | Smith | 2/412 |
| 5,075,904 | 12/1991 | Shirasaki et al. | 2/412 |

*Primary Examiner*—Michael A. Neas
*Attorney, Agent, or Firm*—Bielen, Peterson & Lampe

[57] ABSTRACT

A helmet shell structure utilizing a first inner layer of epoxy resin shaped into a head covering of a desired size and configuration. A second layer of woven fabric is placed atop the first layer of epoxy. A third outer layer of epoxy resin is laid atop the second layer and is cured to a transparent state such that the second layer of woven fabric is visible through the third outer layer of cured epoxy.

3 Claims, 1 Drawing Sheet

HELMET SHELL STRUCTURE

BACKGROUND OF THE INVENTION

The present invention relates to a novel and useful helmet shell structure.

Helmets are now required for use with certain vehicles such as motorcycles, bicycles, and the like. In fact, it is often advisable to employ a helmet in many other situations where the possibility of head injury is eminent.

Although helmets adequately protect the head of the user in most cases, it is important to make a visible inspection of a helmet after an impact has been received thereupon. Prior helmet structures have employed polymeric materials such as vinyl ester, and have included the provision of painting the outer surface of the same. Thus, the inner structure of such helmets is not visible to the user.

A helmet structure which is impact resistant and easily inspected to ascertain its integrity would be a notable advance in the transportation field.

SUMMARY OF THE INVENTION

The present invention relates to a novel helmet shell structure.

The shell of the present invention utilizes a first inner layer of epoxy resin which is shaped into a structure of a desired size and configuration. The first inner layer of epoxy resin is generally placed over a steel mold to achieve such desired shape. The first layer of epoxy may also be cured to a transparent or clear state. Of course, the mold and steel is waxed to allow release of the first layer therefrom.

A second layer of woven fabric laid atop the first layer of epoxy. This may be accomplished when the epoxy is tacky or when it is completely hardened. The second layer of woven fabric may include strong materials such as KEVLAR, an aramid based polymer, carbon fiber, and the like. In addition, the second layer of woven fabric may be a combination of two or more of these materials.

A third outer layer of epoxy resin is placed atop the second layer and is spread to a uniform thickness thereabove. Subsequent outer layers of epoxy resin may be employed as desired. In any case, the outer layer is cured to a hardened state in which it is transparent, allowing the user to visually inspect the second layer of woven fabric thereunder. Air bubbles are worked out of the outer layer by hand or through the use of an outer mold.

In certain cases, a fourth layer of fiber glass material may be interposed the first layer and the second layer of woven fabric. It has been found that a fiber glass layer exhibits superior resistance to repeated impacts on the helmet. In many cases, the fabric elastic layer may be placed only along a portion of the helmet, especially over the ears and up the side portions of the helmet toward the top thereof. Again, the fiber glass layer would still permit the user to visually inspect the second layer of woven fabric.

It may be apparent that a novel and useful helmet shell structure has been described.

It is therefore an object of the present invention to provide a helmet shell structure which incorporates a layer of woven fabric therein which adds to the strength and durability of the helmet shell.

Another object of the present invention is to provide a helmet shell structure which includes an outer layer of hardened epoxy material which is transparent to permit visual inspection of the woven layer of fabric within the helmet.

A further object of the present invention is to provide a helmet shell structure which incorporates a woven fabric of great strength with a fiber glass layer to certain portions of the helmet shell in order to maximize impact resistance of the helmet shell.

Another object of the present invention is to provide a helmet shell structure which exhibits great strength and is aesthetically pleasing to the user.

The invention possesses other objects and advantages especially as concerns particular characteristics and features thereof which will become apparent as the specification continues.

Figure 1:
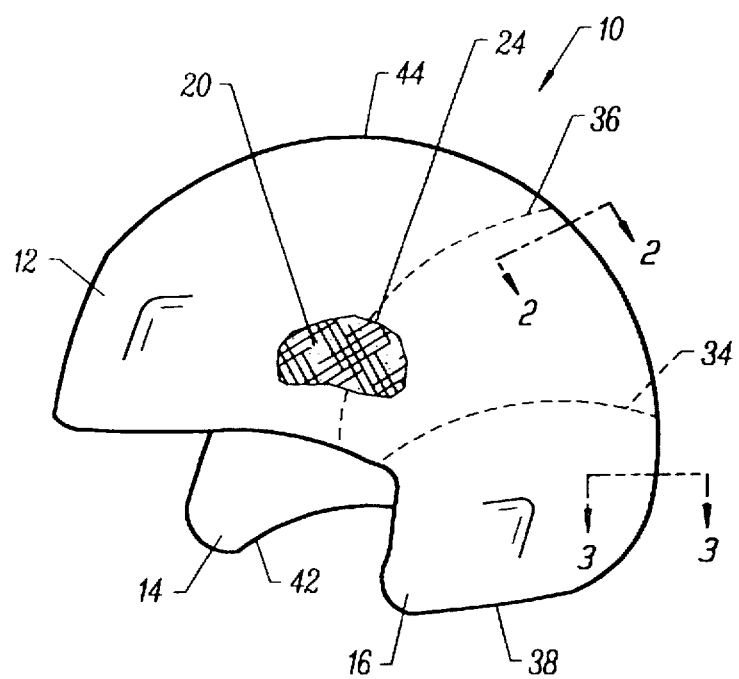
FIG. 1 is a front and left side perspective view of the helmet shell of the present invention.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be taken in conjunction with hereinbefore described drawings.

The invention as a whole is depicted in the drawings by reference is character 10. The helmet shell 10 is generally shaped into a hemispherical configuration having a portion 12 which generally covers the head of the user and distending flanges 14 and 16 which cover the ears of the user.

Figure 2:
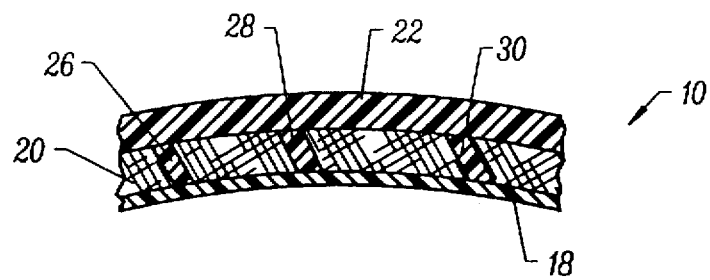
FIG. 2 is a sectional view taken along line 2—2 of FIG. 1.

Referencing FIG. 2, it may be observed that shell 10 is formed by a first inner layer of epoxy resin 18 which is generally formed over a mold constructed of steel, composite, or other materials to produce the configuration and size of shell 10. In the normal course of molding, the mold is waxed to release first layer 18 therefrom when it has hardened. Shell 10 may be employed with face shields and fastening straps for use as a vehicle helmet.

Also included in the present invention is a second layer 20 of woven fabric material which is positioned atop the first layer of epoxy. Second layer 20 may take the form of strong artificial fibers, such as carbon fiber, KEVLAR, an aramid based polymer, combinations of these two, and the like. Second layer 20 may be placed above first inner layer 18 when first inner layer is tacky or when first inner layer 18 is completely cured, of course, second inner layer 20 may be fitted by cutting or shearing such material from a sheet of material as needed.

Third layer 22 is laid atop second layer 20. Third layer 22 consists of an epoxy resin which is cured to a hardened transparent state. Thus, the user is able to look through third layer 22 after it is cured and observe the state of second layer 20 thereunder. Returning to FIG. 1, it may be apparent that a section 24 is illustrated in which second layer 20 is visible. However, it should be understood that illustrative section 24 is provided for the sake of clarity, since second layer 20 would be visible throughout helmet shell 10 when viewed from the outer surface thereof. In addition, epoxy resin from third layer 22 penetrates second layer 20 during the curing process of third 22. Epoxy plugs 26, 28, and 30 are depicted on FIG. 2 to schematically represent such penetration. It has been found that epoxy flowing from third layer 22 through second layer 20 completely saturates second layer 20 to form an integral shell 10.

Figure 3:
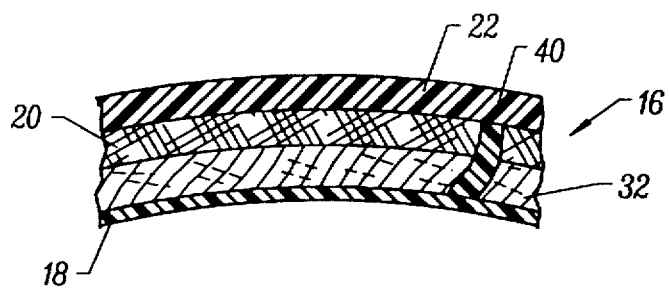
FIG. 3 is a sectional view taken along line 3—3 of FIG. 1.

The structure of flange 16 is represented by FIG. 3 and includes first inner layer 18, second layer 20 and third outer layer 22 which are essentially identical to those depicted in FIG. 2. However, fourth layer 32 has been added in the form of a fiberglass glass material. Dashed lines 34 and 36 of FIG. 1 illustrate possible perimeters for the use of fourth layer 32. In other words, fourth layer 32 may be interposed first layer 18 and second layer 20 beginning at the lower edge 38 of flange 16 and extend up to dashed line 34 or dashed line 36. Fourth layer 32 increases the impact resistance of helmet shell 10 in areas which are considered critical for protection during a crash. It should be noted that flange 14 includes a similar structure to that shown for flange 16. Epoxy plug 40 is schematically representative of the penetration of the epoxy flowing from third outer layer 22, during the curing process, through second layer 20 and fourth layer 32. Again, it should be realized that epoxy from the third layer 22 completely saturates second layer 20 and fourth layer 32 to form an integral flange 16 which is a portion of helmet shell 10.

In operation, helmet shell 10 is formed by the provision of a first inner layer of epoxy resin 18 overlain by a second layer of woven fabric 20, and providing a third outer layer 22 of epoxy resin which cures to a hardened transparent state. An additional fourth layer 32 of fiber glass material may be interposed first layer 18 and second layer 20 in critical areas of helmet shell 10, i.e., at ear-protecting flanges 14 and 16. The user of helmet 10 wears the shell in the normal configuration when appropriate straps and face guards have been applied to shell 10. Second layer 20 is completely visible throughout the outer surface of helmet shell 10 and may be inspected for damage following any traumatic contact of helmet shell 10 with an object. The sections of helmet 10 between the edges 38 and of flange 16 and the edge 42 of flange 14 upwardly to top 44 of helmet 10 may be further reinforced by fiber glass layer 32 to exemplary perimeters 34 and 36. It has been found that helmet 10 is extremely strong and aesthetically pleasing as well as possessing the quality of allowing the user to inspect inner second layer 20 at all times.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A helmet shell structure, comprising:
   a. first inner layer of epoxy resin shaped into a structure of desired size and configuration;
   b. a second layer of woven fabric laid atop the first layer of epoxy;
   c. a third outer layer of epoxy resin laid atop said second layers, said epoxy resin of said third outer layer being in situ cured to a transparent state over said second layer, wherein said second layer of woven fabric is visible through said outer layers of in situ cured epoxy resin, said third outer layer of in situ cured epoxy resin penetrating said second layer of woven fabric; and
   d. a fourth layer of fiberglass interposed said first layer of epoxy resin and second layer of woven fabric, said fourth layer extending over only a portion of the shell, said second layer being visible through said third outer layer of in situ cured epoxy where said fourth layer of fiberglass extends.

2. The structure of claim 1 in which said third layer of epoxy resin penetrates said fourth layer of fiber glass.

3. The structure of claim 1 in which said second layer of woven fabric is selectively from the group consisting of aramid based polymer, carbon fibers, and a mixture of aramid based polymer and carbon fibers.

* * * * *